United States Patent [19]

Fricker et al.

[15] 3,641,986
[45] Feb. 15, 1972

[54] FOUR-CYCLE INTERNAL COMBUSTION ENGINE

[72] Inventors: Ludwig Fricker, Stuttgart-Feuerbach; Manfred Schafer, Stuttgart, both of Germany

[73] Assignee: Daimler-Benz Aktiengesellschaft, Stuttgart-Unterturkheim, Germany

[22] Filed: May 22, 1970

[21] Appl. No.: 39,787

[30] Foreign Application Priority Data

May 24, 1969 Germany .................... P 19 26 613.8

[52] U.S. Cl. ........................................ 123/30 C, 123/32 R
[51] Int. Cl. ................................................ F02b 23/08
[58] Field of Search ............. 123/30 A, 30 B, 30 C, 32, 32 F, 123/32 SP

[56] References Cited

UNITED STATES PATENTS

| 1,856,328 | 5/1932 | French | 123/30.2 |
|---|---|---|---|
| 2,504,036 | 4/1950 | Morrions | 123/32 |
| 2,766,738 | 10/1956 | Hoffmann | 123/32 |
| 2,851,019 | 9/1958 | Fleming et al. | 123/32 |
| 3,304,922 | 2/1967 | Hideg | 123/32 |
| 2,125,293 | 8/1938 | Hesselman | 123/32 |

Primary Examiner—Laurence M. Goodridge
Attorney—Craig, Antonelli and Hill

[57] ABSTRACT

A four-cycle internal combustion engine, particularly with externally controlled ignition, in which the piston is provided with an essentially cylindrical piston combustion space and in which a swirl of the charge present in the combustion space is produced by suitable squeeze flow channels terminating substantially tangentially in the piston combustion space within the area of the compression top dead center position of the working piston; the squeeze flow channels are formed by a suitable design of the working piston and/or of the cylinder head.

21 Claims, 4 Drawing Figures

FOUR-CYCLE INTERNAL COMBUSTION ENGINE

The present invention relates to a four-cycle internal combustion engine, especially with externally controlled or applied ignition, having a piston combustion space of essentially circular cylindrical shape and means for producing a vortexing or swirling flow of the charge present in the combustion space.

With such known internal combustion engines of the prior art, approximately spirallike curved inlet channels are utilized in general for producing the swirling inflow, by means of which it is to be assured that the main quantity of the combustion air flowing into the cylinder space, flows into the same approximately tangentially. Disadvantageous with these and similar measures provided also within the area of the inlet channel and inlet valve for the production of the vortexing or swirling is, however, that they lead with higher air velocities to an increasing throttling of the air inflow which still further increases with the strength of the produced swirl or vortex. Even though this disadvantage is negligible with Diesel engines which, as is known, operate with relatively low maximum rotational speeds and generally have an excess of air under all load conditions, this disadvantage occurs nevertheless to a greater extent with internal combustion engines operating with externally controlled or applied ignition. With the latter types of engines, the maximum power is limited simultaneously with the strength of the produced vortex or swirl of the inflowing combustion air. An output increase beyond this limit can be achieved only by a reducing of the vortex or swirl, by an overdimensioning of the inlet channel and inlet valve or by a supercharging.

The present invention is concerned with the task to so perfect the internal combustion of the aforementioned type that the filling of the working cylinder cannot be impaired by the means for producing the swirl or eddy.

The underlying problems are solved according to the present invention essentially by a configuration of the working piston and/or of the cylinder head forming within the area of the compression top dead center position of the working piston of the aforementioned internal combustion engine, squeeze flow channels terminating tangentially in the piston combustion space.

With such a design and configuration of the combustion space, no consideration need be given to a possible swirl production in connection with the design of the inlet channels and of the inlet valves. These parts, in contradistinction thereto, may be constructed solely according to considerations of a flow that is as free from losses as possible. The vortex or swirl production takes place only in the last range of the compression stroke of the working piston where the air still disposed outside the piston combustion space between the piston top and the cylinder head is forced, as a result of the increasing squeeze flow, into the squeeze flow channels, by way of which it then flows tangentially into the piston combustion space.

According to a preferred embodiment of the present invention at least two channels terminating tangentially in the same direction in the piston combustion space are arranged in the piston top of the working piston of the internal combustion engine uniformly distributed about the piston combustion space.

According to a further also preferred construction of the present invention, the piston top is offset with a spacing on both sides of the piston combustion space up to approximately half the depth thereof and the cylinder head is recessed in a similar manner into the cylinder space whereby a channel leads into the piston combustion space from each of the two outer squeeze spaces formed thereby. With such a design and configuration of the piston top and of the cylinder head, a considerable proportion of the air volume present in the cylinder space within the aforementioned squeeze spaces is displaced through the two channels tangentially into the piston combustion space near the end of the compression stroke so that a considerable swirl or eddying flow of the charge prevails in the piston combustion space during the ignition and combustion.

According to a further feature of the present invention with a construction of the internal combustion engine having external or applied ignition and direct injection of the fuel into the piston combustion space, an injection nozzle is arranged within the area of one channel discharge orifice and a spark plug is arranged opposite the inflow direction in front of the other channel discharge aperture.

Accordingly, it is an object of the present invention to provide a four-cycle internal combustion engine with externally controlled ignition which avoids by simple means the aforementioned shortcomings and drawbacks encountered in the prior art.

Another object of the present invention resides in a four-cycle internal combustion engine with applied ignition in which a swirl of the charge present in the combustion space is produced by means other than the inlet channel and/or inlet valves.

A further object of the present invention resides in a four-cycle internal combustion engine of the type described above in which minimal flow looses can be assured within the inlet channel.

Another object of the present invention resides in an internal combustion engine with externally controlled ignition that permits the attainment of high power output without the need of supercharging and without impairing the filling of the working cylinder by the means used for producing the swirl of the charge in the combustion space.

Still a further object of the present invention resides in a four-cycle internal combustion engine with applied ignition in which complete freedom is given to the design of the engine as regards the construction of the inlet channels and inlet valves.

These and further objects, features and advantages of the present invention will become more obvious from the following description when taken in connection with the accompanying drawing, which shows, for purposes of illustration only two embodiments in accordance with the present invention, and wherein.

Figure 1:
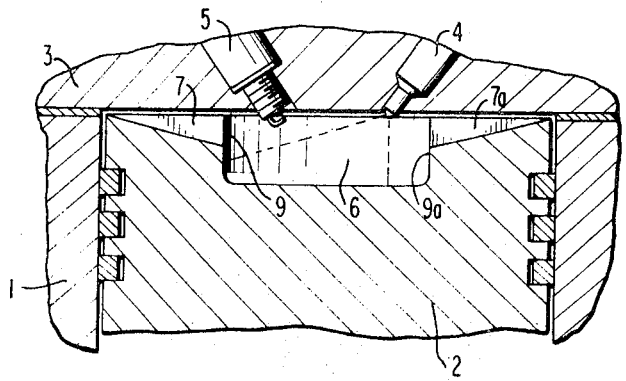
FIG. 1 is a partial schematic axial cross-sectional view of a first embodiment of an internal combustion engine in accordance with the present invention, taken along line I—I of FIG. 2.
Figure 2:
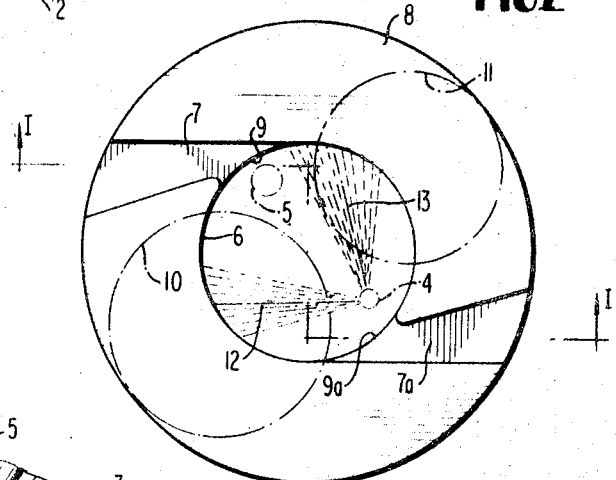
FIG. 2 is a plan view of the working piston of the internal combustion engine according to FIG. 1.

Referring now to the drawing wherein like reference numerals are used throughout the various views to designate like parts, and more particularly to FIGS. 1 and 2, the internal combustion engine illustrated in these figures includes a working cylinder 1 and a working piston 2 reciprocating in the working cylinder in a conventional manner as well as a cylinder head 3 in which are arranged an injection nozzle 4 and a spark plug 5.

The working piston 2 is provided with an axial piston combustion space 6 of essentially cylindrical configuration, about which are arranged two grooves or channels 7 and 7a terminating in the same direction tangentially in the piston combustion space 6 and distributed uniformly about the piston combustion space 6. The channels 7 and 7a start from the outer edge of the piston top 8 where they have their maximum width and a negligibly small depth. In the direction toward the piston combustion space 6 the grooves or channels 7 and 7a, however, have a drop up to a maximum depth at the discharge place 9 and 9a, respectively, that corresponds about to half the depth of the piston combustion space 6.

The internal combustion engine includes in its cylinder head 3 an inlet valve 10 and an outlet valve 11 in the manner indicated in dash and dot lines in FIG. 2. The injection nozzle 4 and the spark plug 5 are arranged in the cylinder head 3 within the area between these two valves. The injection nozzle 4 is thereby located within the area of the one channel discharge 9a and the spark plug 5 in front of the other channel discharge 9. The injection nozzle 4 is constructed as conventional two-apertured nozzle from which the one jet 12 is directed essentially in the direction of swirl of the squeeze flow flowing into the piston combustion space 6 and the other jet 13 is directed essentially opposite this swirl direction.

During the operation of the described internal combustion engine, a squeeze flow is produced at the end of the compression stroke between the piston top 8 and the cylinder head 3 which flows tangentially into the piston combustion space 6 by way of the channels 7 and 7a and produces thereby the desired swirl or vortex.

Figure 3:
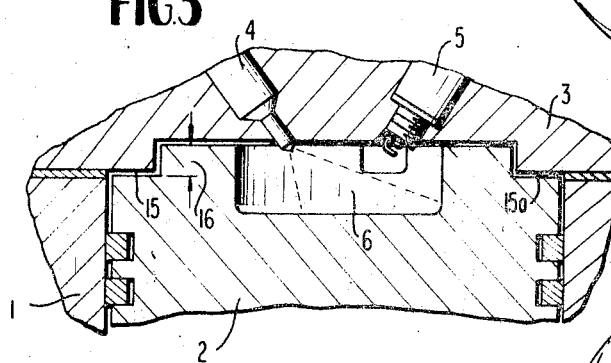
FIG. 3 is a partial schematic axial cross-sectional view through a second embodiment of an internal combustion engine in accordance with the present invention, taken along line III—III of FIG. 4.
Figure 4:
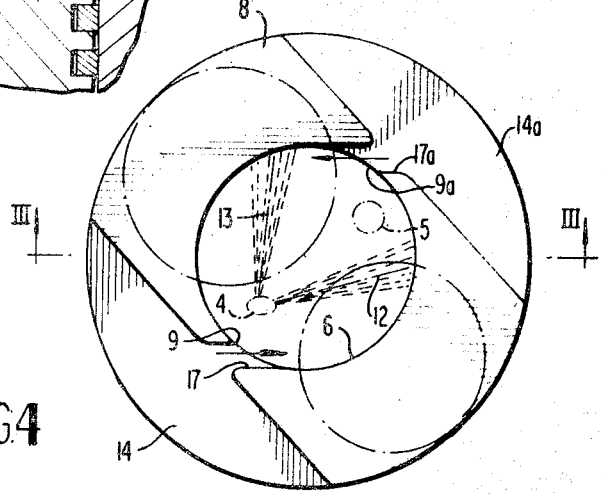
FIG. 4 is a plan view of the working piston of the internal combustion engine according to FIG. 3.

Also, in the internal combustion engine illustrated in FIGS. 3 and 4 and corresponding to the second embodiment of the present invention, the piston 2 is provided with an axial, essentially cylindrical piston combustion space 6. However, in this embodiment, the piston bottom 8 is offset at a distance on both sides of the piston combustion space 6 up to approximately half the depth thereof so that one squeeze space 14 and 14a each is formed, respectively, in the two oppositely disposed edge areas of the piston bottoms. The cylinder head 3 is offset in an analogous manner in the direction toward the cylinder space and forms accordingly two oppositely disposed steps 15 and 15a which practically completely fill the squeeze spaces 14 and 14a in the upper or top dead center position of the piston 2. The height 16 of the steps 15 and 15a—and therewith at the same time the offset of the piston top 8—corresponds approximately to the depth of the channels or grooves 17 and 17a which lead from the squeeze spaces 14 and 14a tangentially into the piston combustion space 6. These only relatively short channels or grooves 17 and 17a have an approximately rectangular cross section.

Also, in this embodiment an injection nozzle 4 is provided within the area of the one groove or channel discharge 9 and a spark plug 5 in front of the other groove or channel discharge 9a, and more particularly opposite or upstream of the channel discharge 9a as viewed in the direction of inflow out of the channel 17a. The injection nozzle 4 is constructed as two-apertured nozzle, from which one jet 12 is directed essentially in the swirl direction of the squeeze flow flowing into the combustion space 6 and the other injection jet 13 is directed essentially opposite this swirl direction. The injection jet 12 is directed at the same time into the area of the spark plug 5, and more particularly at a place of the sidewall of the piston combustion space 6, from which the fuel or the mixture produced by the same is taken or torn along by the swirl flow in the direction toward the spark plug 5.

The operation of this described internal combustion engine corresponds to the operation of the internal combustion engine of the first embodiment. By reason of the squeeze spaces 14 and 14a the proportion of the squeeze flow displaced through the channels 17 and 17a into the piston combustion space 6 is, however, considerably larger than in the first embodiment.

In order that the compression swirl or vortex produced in the described internal combustion engines is available already at the moment of or directly after the ignition, it is possible to operate the described internal combustion engines with a slightly later ignition instant than is customary with the present-day internal combustion engines with externally controlled or applied ignition.

While we have shown and described two embodiments in accordance with the present invention, it is understood that the same is not limited thereto but is susceptible of numerous changes and modifications as known to those skilled in the art. Furthermore, the present invention is not limited to all of the details described in connection with the illustrated embodiments. In particular, the arrangement of the injection nozzle and of the spark plug may also be different from that shown and described.

Even though the present invention is preferred for internal combustion engines with direct fuel injection into the compression stroke, it is applicable with similar advantages also to those internal combustion engines in which the fuel is injected either completely or partially at an earlier instant or is drawn in in the form of a fuel-air mixture. Finally, it is also within the purview of the present invention to apply the concept of the compression swirl of the present invention to Diesel engines without departing from the spirit and scope of the present invention. Thus, it is obvious that the present invention is not limited to the details shown and described herein and we therefore do not wish to be limited to these details but intend to cover all such changes and modifications as are encompassed by the scope of the appended claims.

We claim:

1. A four-cycle internal combustion engine comprising a working cylinder, a cylinder head, a working piston in the working cylinder, a substantially axially symmetrical piston combustion space, and swirl means for producing a swirl flow of the charge present in the combustion space, said swirl means including squeeze flow channel means terminating substantially tangentially in the combustion space within the area of the compression top dead center position of the working piston, said squeeze flow channel means being formed by a corresponding shape of at least one of the two parts consisting of the working piston and the cylinder head, characterized by an injection nozzle means arranged within the area of the channel discharge of one channel means and by a spark plug arranged in front of the channel discharge of another channel means.

2. An internal combustion engine according to claim 1, characterized in that the squeeze flow channel means are constituted by a corresponding shape of the working piston.

3. An internal combustion engine according to claim 1, characterized in that said squeeze flow channel means are formed by a corresponding shape of the cylinder head.

4. An internal combustion engine according to claim 1, characterized in that said squeeze flow channel means are formed by corresponding configuration of the working piston and cylinder head.

5. An internal combustion engine according to claim 1, characterized in that the piston combustion space is of substantially circular cylindrical shape.

6. An internal combustion engine according to claim 5, characterized in that two channel means terminating in the same direction, substantially tangentially in the piston combustion space are arranged in the piston top of the working piston.

7. An internal combustion engine according to claim 6, characterized in that the channel means are distributed substantially uniformly about the piston combustion space.

8. An internal combustion engine according to claim 7, characterized in that the channel means start from the outer end of the piston top and have an incline increasing from a negligibly small depth at the piston top edge in the direction toward the piston combustion space up to about half the depth of the piston combustion space.

9. An internal combustion engine according to claim 8, characterized in that the width of the channel means increases in the direction toward the outer piston top edge.

10. An internal combustion engine according to claim 7, characterized in that the piston top is offset at a distance on both sides of the piston combustion space to about half the depth thereof and the cylinder head is offset in a corresponding manner into the cylinder space, and in that one channel means extends from each of the thus formed two outer squeeze spaces into the piston combustion space.

11. An internal combustion engine according to claim 1, characterized in that the spark plug is arranged upstream of the discharge aperture of the other channel means as viewed in the inflow direction.

12. An internal combustion engine according to claim 11, characterized in that the injection nozzle means is constructed as two-apertured nozzle producing an injection jet directed essentially in the swirl direction into the area of the spark plug and another injection jet directed essentially opposite the swirl direction.

13. An internal combustion engine according to claim 10, characterized in that the spark plug is arranged upstream of the discharge aperture of the other channel means as viewed in the inflow direction.

14. An internal combustion engine according to claim 13, characterized in that the injection nozzle means is constructed as two-apertured nozzle producing an injection jet directed essentially in the swirl direction into the area of the spark plug and another injection jet directed essentially opposite the swirl direction.

15. An internal combustion engine according to claim 1, characterized in that two channel means terminating in the same direction, substantially tangentially in the piston combustion space are arranged in the piston top of the working piston.

16. An internal combustion engine according to claim 1, characterized in that the channel means are distributed substantially uniformly about the piston combustion space.

17. An internal combustion engine according to claim 1, characterized in that the channel means start from the outer end of the piston top and have an incline increasing from a negligibly small depth at the piston top edge in the direction toward the piston combustion space up to about half the depth of the piston combustion space.

18. An internal combustion engine according to claim 17, characterized in that the width of the channel means increases in the direction toward the outer piston top edge.

19. An internal combustion engine according to claim 1, characterized in that the piston top is offset at a distance on both sides of the piston combustion space to about half the depth thereof and the cylinder head is offset in a corresponding manner into the cylinder space, and in that one channel means extends from each of the thus formed two outer squeeze spaces into the piston combustion space.

20. An internal combustion engine according to claim 1, characterized in that the injection nozzle means is constructed as two-apertured nozzle producing an injection jet directed essentially in the swirl direction into the area of the spark plug and another injection jet directed essentially opposite the swirl direction.

21. An internal combustion engine according to claim 20, characterized in that the spark plug is arranged upstream of the discharge aperture of the other channel means as viewed in the inflow direction.

* * * * *